United States Patent [19]

Martin et al.

[11] Patent Number: 5,597,519
[45] Date of Patent: Jan. 28, 1997

[54] ULTRAVIOLET CYCLING OVEN FOR POLYMERIZATION OF CONTACT LENSES

[75] Inventors: Wallace A. Martin, Orange Park, Fla.; Ture Kindt-Larsen, Holte, Denmark; Jonathan P. Adams, Jacksonville, Fla.

[73] Assignee: Johnson & Johnson Vision Products, Inc., Jacksonville, Fla.

[21] Appl. No.: 257,799

[22] Filed: Jun. 10, 1994

[51] Int. Cl.⁶ .................................................... B29D 11/00
[52] U.S. Cl. .................. 264/1.38; 264/494; 264/40.6; 264/40.7; 425/143; 425/174.4; 425/150
[58] Field of Search ............... 264/1.36, 1.38, 264/22, 40.6, 494, 40.7, 85; 425/143, 174, 174.4, 808, 150

[56] References Cited

U.S. PATENT DOCUMENTS

| | | |
|---|---|---|
| 3,423,488 | 1/1969 | Bowser ................................. 425/808 |
| 4,132,518 | 1/1979 | Rips ...................................... 425/143 |
| 4,495,313 | 1/1985 | Larsen . |
| 4,565,348 | 1/1986 | Larsen . |
| 4,640,489 | 2/1987 | Larsen . |
| 4,680,336 | 7/1987 | Larsen et al. . |
| 4,691,820 | 9/1987 | Martinez . |
| 4,889,664 | 12/1989 | Kindt-Larsen et al. . |
| 4,890,997 | 1/1990 | Beins et al. ............................. 264/22 |
| 5,028,358 | 7/1991 | Blum .................................... 264/1.38 |
| 5,039,459 | 8/1991 | Kindt-Larsen et al. . |
| 5,080,839 | 1/1992 | Kindt-Larsen . |
| 5,094,609 | 3/1992 | Kint-Larsen . |
| 5,135,685 | 8/1992 | Masuhara et al. ..................... 264/1.36 |
| 5,135,686 | 8/1992 | Masuhara et al. ..................... 264/1.36 |
| 5,364,256 | 11/1994 | Lipscomb et al. ..................... 264/22 |

Primary Examiner—Mathieu D. Vargot

[57] ABSTRACT

A method and apparatus for molding contact lenses by curing polymerizable compositions in suitably dimensioned molds using ultraviolet or other polymerization-inducing radiation and heat. The molds are moved along a source of radiation such that the intensity of the radiation to which the composition is exposed rises and falls several times, thereby achieving superior results by balancing the initiation and the propagation of the polymerization.

22 Claims, 1 Drawing Sheet

5,597,519

1

ULTRAVIOLET CYCLING OVEN FOR POLYMERIZATION OF CONTACT LENSES

BACKGROUND OF THE INVENTION

The present invention relates to the production of contact lenses. It relates more particularly to the production of contact lenses by the polymerization of a polymerizable composition in a mold which imparts to the polymerized composition the shape and size dimensions desired of a contact lens. Specifically, the present invention relates to the stage in such a production scheme wherein the polymerization of the polymerizable composition actually occurs.

Those familiar with the field of producing polymerized articles from polymerizable compositions are aware in general that compositions comprising one or more olefinically unsaturated monomers together with a small but effective amount of a polymerization initiator which is responsive to ultraviolet radiation of a given intensity and/or wavelength can be initiated by exposure of the composition to the indicated wavelength and intensity of ultraviolet radiation. However, it is also generally recognized that control of the initiation and propagation of polymerization is difficult. Accordingly, in many conventional applications of ultraviolet-initiated polymerization, the polymerization has been sought to be controlled by variations of the identity and/or amount of ultraviolet initiator, the presence and/or amount of polymerization inhibitor, and the characteristics of the single burst of ultraviolet radiation used to initiate the polymerization itself.

Because of the relative difficulty of controlling the polymerization characteristics and the properties of the resultant polymerized article, it has generally been considered that ultraviolet-induced polymerization is not completely satisfactory as a means for producing polymerized articles which must pass exacting requirements as to the dimensions and the physical properties such as structural integrity, surface smoothness, freedom from discernable irregularities in the internal structure and surface finish, clarity, transparency, and the like. Contact lenses are noteworthy examples of such articles which are subject indeed to numerous exacting criteria, by virtue of both the physical reality that contact lenses with even minor defects are considered unwearable, and of the regulations governing such articles prescribed by the U.S. Food and Drug Administration, among other national and international authorities.

There is therefore a need for a method and means for producing articles such as contact lenses via the ultraviolet-induced polymerization of compositions comprising olefinically unsaturated monomers.

BRIEF SUMMARY OF THE INVENTION

In one aspect, the present invention resides in an apparatus for polymerizing a polymerizable composition held in a mold to form a contact lens therefrom, wherein said mold is transparent to ultraviolet radiation and imparts the desired shape of a contact lens to said composition upon polymerization of said composition, the apparatus comprising a radiation source which emits polymerizing radiation such as ultraviolet radiation, said source having a longitudinal axis; wherein the intensity of said radiation transmitted to a given plane parallel to said axis exhibits maximal values, sufficient to initiate polymerization of said composition, within at least two regions of maximal intensity along said axis and values less than said maximal values yet sufficient to initiate said polymerization in regions of lesser intensity between each adjacent pair of said at least two regions and at each end of said axis;

a transport apparatus capable of moving said mold relative to said source in said plane along a path equidistant from said longitudinal axis from one end thereof to the other, at a distance from said source such that said polymerizable composition is exposed to radiation of said maximal intensity value when said mold is adjacent to said regions of maximal intensity and to radiation of said lesser intensity value when said mold is adjacent said regions of lesser intensity;

a heater capable of heating said polymerizable composition while said composition is exposed to said radiation to a temperature effective to promote the propagation of said polymerization and to minimize shrinkage of said composition upon polymerization thereof; and a controller which controls the rate of movement of said mold relative to said source and the temperature of said composition during exposure thereof to heat from said heater, so as to cause complete initiation of polymerization of said composition and effective to cause polymerization of said composition into a body useful as a contact lens.

In another aspect, the present invention resides in a process for forming a contact lens comprising providing a mold assembly comprising a front mold half and a back mold half which together form a cavity therebetween in the shape and size of a contact lens, the mold cavity further comprising a composition disposed in said cavity which is polymerizable upon exposure thereof to polymerization-initiating radiation, wherein at least one of said mold halves is transparent to said radiation;

providing a source of polymerization-initiating radiation, said source having a longitudinal axis, wherein the intensity of said radiation transmitted to a given plane parallel to said axis exhibits maximal values, sufficient to initiate polymerization of said composition, within at least two regions of maximal intensity along said axis and values less than said maximal values in regions of lesser intensity between each adjacent pair of said at least two regions and at each end of said axis;

providing a source of heat to said polymerizable composition in said cavity while said composition is being exposed to radiation from said source said heat being sufficient to promote the propagation of said polymerization and to minimize shrinkage of said composition upon polymerization thereof; and exposing said polymerizable composition to radiation from said source while moving said mold assembly relative to said source in said plane along a line equidistant from said longitudinal axis from one end thereof to the other at a distance from said source means such that said polymerizable composition is exposed to radiation sufficient to initiate polymerization of said composition at a first initiation rate when said mold assembly is adjacent to said regions of maximal intensity and at a second initiation rate (less than said first rate) when said mold assembly is adjacent said regions of lesser intensity while controlling the rate of said movement and the amount of heat supplied to said composition from said source of heat so as to cause complete initiation of polymerization of said composition and to cause said composition to polymerize into a body useful as a contact lens.

DETAILED DESCRIPTION OF THE INVENTION

The invention will be described herein with respect to the production of contact lenses. The term "contact lenses" is intended to embrace lenses which when removed from the mold assembly in which they are made are of a size, shape and power that they can be worn in the eye. The term "contact lenses" is also intended to embrace articles which upon removal from the mold assembly need to be hydrated and swelled into a lens of size, shape and power as to be wearable. Such production is the application that constitutes the preferred embodiment of this invention.

Figure 1:
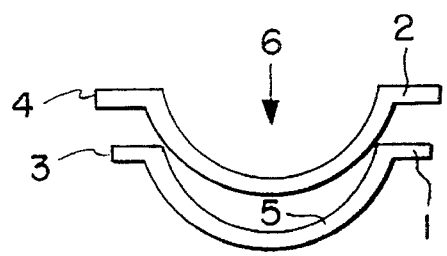
FIG. 1 is a cross-sectional view of a mold assembly used in polymerizing a contact lens.

Referring to FIG. 1, the invention is preferably carried out using a mold assembly formed of a front surface mold half 1 and a back surface mold half 2. As used herein, the term "front mold half" refers to the mold half whose concave surface is used to form what will be the front surface of the contact lens. As used herein, the term "back mold half" refers to the mold half whose convex surface forms what will be the back surface of the contact lens. In the preferred alignment, mold halves 1 and 2 are of a concavo-convex shape, preferably including planar annular flanges 3 and 4, respectively, surrounding the uppermost edges of the concavo-convex regions of the mold halves.

Typically, the two mold halves are arrayed as a "sandwich". The front surface mold half 1 is on the bottom, with the concave surface of the mold half facing upwards. The back surface mold half 2 is disposed symmetrically on top of the front surface mold half, with the convex surface of the back surface mold half projecting partially into the concave region of the front surface mold half. Preferably, the back surface mold half is dimensioned such that the convex surface thereof engages the outer edge of the concave surface of the front mold half throughout its circumference, thereby cooperating to form a sealed mold cavity 5.

The mold halves should be made of thermoplastic and should be transparent to polymerization-initiating radiation, by which is meant that some and preferably all radiation of an intensity and wavelength effective to initiate polymerization of the polymerizable composition in the mold cavity 5 can pass through the mold halves. Ultraviolet radiation is the type most frequently employed, although visible light initiators are also viable and part of this invention. In the following description, ultraviolet radiation will be referred to.

The mold halves are preferably made of polystyrene, or other polymer so long as the mold half is transparent to ultraviolet and permits removal of a contact lens. Other examples of suitable hermoplastics include polyvinylchloride, polyethylene, polypropylene, copolymers or mixtures of styrene with acrylonitrile or butadiene, polyacrylonitrile, polyamides, polyesters, and the like.

A quantity of a polymerizable composition is disposed in the mold cavity 5 and preferably completely fills mold cavity 5. The polymerizable composition should comprise any material or mixture of materials which upon polymerization yields an optically clear, integral shape-sustaining contact lens or contact lens precursor. By "precursor" is meant an object which has the desired relative dimensions and which upon subsequent hydration in water or buffered isotonic saline aqueous solution can be worn as a contact lens. Examples of such compositions abound in this field and are readily ascertainable by reference to standard literature sources. Examples including copolymers based on 2-hydroxyethyl methacrylate ("HEMA") and one or more comonomers such as 2-hydroxyethyl acrylate, methyl acrylate, methyl methacrylate, vinyl pyrrolidone, N-vinyl acrylamide, hydroxypropyl methacrylate, isobutyl methacrylate, styrene, ethoxyethyl methacrylate, methoxy triethyleneglycol methacrylate, glycidyl methacrylate, diacetone acrylamide, vinyl acetate, acrylamide, hydroxytrimethylene acrylate, methoxyethyl methacrylate, acrylic acid, methacrylic acid, glyceryl methacrylate, and dimethylamino ethyl acrylate.

Preferred polymerizable compositions are disclosed in U.S. Pat. Nos. 4,495,313 to Larsen, 5,039,459 to Larsen et al. and 4,860,336 to Larsen et al., the disclosures of which are hereby incorporated herein by reference. Such compositions comprise anhydrous mixtures of a polymerizable hydrophilic hydroxy ester of acrylic acid or methacrylic acid and a polyhydric alcohol, and a water displaceable ester of boric acid and a polyhydroxyl compound having preferably at least 3 hydroxyl groups. Polymerization of such compositions, followed by displacement of the boric acid ester with water, yields a hydrophilic contact lens.

Polymerization of this preferred material, as well as many other polymerizable compositions, should be carried out in an atmosphere containing as little oxygen as possible, preferably oxygen-free, because oxygen can enter into side reactions which interfere with the desired optical quality and clarity of the polymerized lens. Oxygen disturbs the reproducibility of the desired parameters of the lens. Preferably, the lens mold halves also are prepared in an atmosphere which is oxygen-free or contains as little oxygen as possible, to avoid the risk that oxygen absorbed in or on the mold half would react with the polymerizable composition.

A preferred technique for ensuring maximum freedom from oxygen is to prepare the mold halves under a nitrogen atmosphere ("blanket"); and especially to keep the polymerizable composition sealed against oxygen until it is ready to use, and then to fill the polymerizable composition into the mold half, assemble the mold assembly, and carry out any pre-cure and the curing, all under a nitrogen atmosphere or blanket. This can easily be carried out by encasing the apparatus used in the filling and curing within barriers that form an essentially sealed domain, and maintaining a positive flow pressure of nitrogen within that domain. The barriers can comprise flat, clear sections of plastic such as acrylate (e.g. "Plexiglass") assembled into a bottom, front and back sides, and top.

Figure 2:
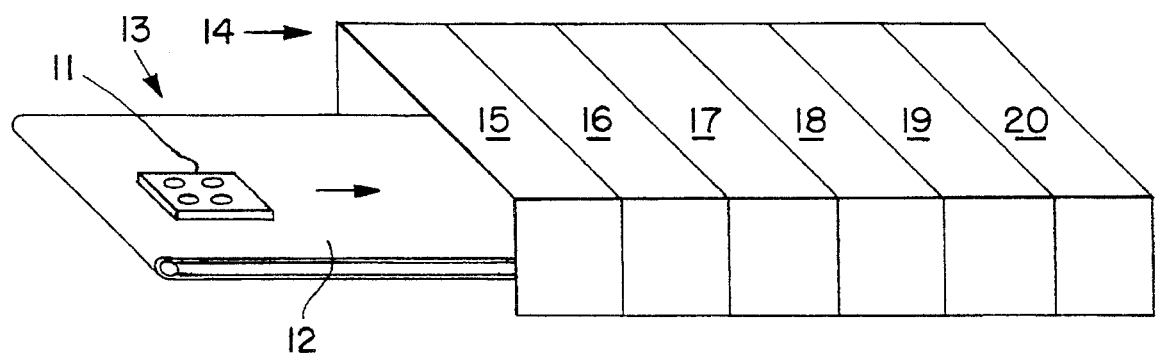
FIG. 2 is a perspective view of an apparatus useful in practicing the present invention, including a conveyor and a housing.

Referring to FIG. 2, the mold assembly is preferably held on a carrier 11 which resembles a flat plate having one or more holes therein. Each hole has a vertical axis and is dimensioned to support the mold assembly by the flange 3 of the front surface mold half 1 in a manner such that the concavo-convex portion of the front mold half is suspended within its opening in the carrier.

A preferred apparatus for carrying out the present invention, seen in FIG. 2, includes a conveyor means 12 for moving the mold assembly in the director of the arrow. Preferably, conveyor means 12 is a conveyor belt 13 on which the carrier 11 carrying the mold assembly (or mold assemblies) is carried and is moved in the direction of the arrow in FIG. 2. A conventional control means (not depicted) such as a variable speed motor is connected to conveyor means 12 to control the rate at which the conveyor means 12 and carrier 11 thereon move.

Reference numeral 14 denotes generally a housing for a source which emits ultraviolet radiation as described herein. The housing 14 is disposed over the conveyor means 12 so as to span the path of means 12 leaving a space through which conveyor means 12 carries carrier 11 and mold assembly 6 under the housing. Housing 14 can comprise one unitary section or can be composed of several discrete sections arrayed side by side, as shown as units 15, 16, 17, 18, 19 and 20 in FIG. 2.

Figure 3:
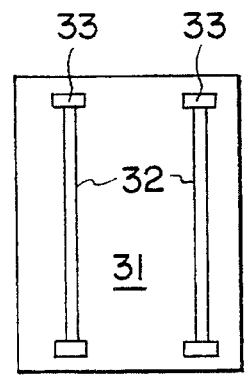
FIG. 3 is a view of the underside of the housing of FIG. 2.

FIG. 3 shows the underside of any of sections 16–20 of FIG. 2. That underside preferably has a flat horizontal surface 31 to which are affixed one or more elongated light bulbs 32 of the type commercially available for emitting ultraviolet radiation. FIG. 3 shows a multiplicity of bulbs, which is the preferred arrangement to use when several ranks of mold assemblies are disposed side-by-side on the conveyor. The bulbs are arrayed side by side, with their longitudinal axes parallel, and with those axes parallel to the direction of travel of the mold assembly. The bulbs are mounted in standard electrical fixtures 33, which hold the bulbs in a horizontal plane parallel to the conveyor and the mold assemblies. The ultraviolet bulbs are preferably positioned with one bulb over each longitudinal row of mold assemblies. Also, there should be one extra bulb at each outside edge, outboard of the longitudinal row of mold assemblies at each edge. Each of the ultraviolet bulbs 32 is connected to an electrical control means (not depicted) for supplying suitable electric current to the bulbs for actuating them to emit ultraviolet radiation.

The bulb or bulbs 32 under which the mold assemblies travel have the property that the intensity of the ultraviolet radiation (measured as, for instance, $mW/Cm^2$) received in any given plane parallel to the axis of the bulb is different at different points along the length (i.e., along the longitudinal axis) of the bulb. At one or more regions between each end of the bulb, the intensity is at a maximal intensity level which as received by a polymerizable composition in said plane causes initiation of polymerization of the polymerizable composition at a first initiation rate. At the ends of the bulb the intensity of the emitted ultraviolet radiation transmitted to that plane is at a second, lesser level to initiate polymerization of the polymerizable composition at a second, lesser initiation rate. During operation, as the mold assembly passes along the length of the bulb, the intensity of the ultraviolet radiation that the mold assembly receives cycles smoothly at least once from the second intensity level up to the first intensity level and back down to the second intensity level.

In this way, polymerization is initiated at a first rate when adjacent to said higher intensity regions and at a second, lesser rate when adjacent to said lesser intensity regions.

Notably, this cycling can be achieved entirely by the movement of the polymerizable composition, preferably at a constant rate, along the axis of the bulbs, while permitting the intensity emitted by the bulb itself at any given point along the bulb to remain at a given constant level at a given point in time (it being recognized that over the course of time the intensity levels as emitted from the bulb can decline). There is no need to vary the intensity of the radiation emitted from any given point along the bulb (i.e., a profile of intensity plotted against position on the bulb at any given time remains constant).

Preferably, two or more such bulbs 33 are arrayed end to end in adjacent housings over the path that the mold assemblies travel. Each bulb can then have at least one region emitting a maximal level of radiation to initiate polymerization and flanking regions of lesser intensity to initiate polymerization. In that way, even if each individual bulb has only one region intermediate its ends which emits a maximal level of radiation, each cycle of increasing and decreasing intensity occurs at least two times, during the passage of a given mold assembly under the series of ultraviolet bulbs. It is preferred that three to six, more preferably five, bulbs be employed end to end so as to expose the polymerizable composition to three to six, preferably five, cycles of increasing and decreasing ultraviolet intensity.

When bulbs are mounted parallel to each other, as shown in FIG. 3, it is preferred that their ends be aligned along a line perpendicular to the direction of travel of the mold assemblies. In that way, the regions of higher and lower intensity encountered by the advancing mold assemblies are uniform in effect. Each mold assembly receives ultraviolet radiation from the bulb directly over it and from the bulbs on each side of that bulb.

In addition, a source of heat is provided which is effective to raise the temperature of the polymerizable composition to a temperature sufficient to assist the propagation of the polymerization and to counteract the tendency of the polymerizable composition to shrink during the period that it is exposed to the ultraviolet radiation. Thus, heating promotes improved polymerization. The heating should be effective to maintain the temperature of the polymerizable composition (by which is meant that composition before it begins to polymerize, and as it is polymerizing) above the glass transition temperature of the polymerized product or above its softening temperature as it is polymerizing. Such temperature can vary with the identity and amount of the components in the polymerizable composition. In general, the system should be capable of establishing and maintaining temperatures on the order of 40° to 75° C.

A preferred source of heat comprises a duct which blows warm air across and around the mold assembly as it passes under the ultraviolet bulbs. The end of the duct can be fitted with a plurality of holes through which warm air passes. Distributing the air in this way helps achieve uniformity of temperature throughout the area under the housing. Uniform temperatures throughout the regions around the mold assemblies permit more uniform polymerization.

It has been discovered that through careful control of the parameters of this operation, as described herein, a superior fully polymerized contact lens can be produced which exhibits reproducible successful production within a relatively minor period of time. Without intending to be bound by any particular theory of operation, the observed performance of this system is consistent with the proposition that as the intensity of the ultraviolet radiation increases, polymerization is initiated at a number of different sites, and that thereafter decreasing the intensity of the ultraviolet radiation, coupled with exposure to an effective amount of heat, permits the initiated polymerization to propagate preferentially over the continued initiation of new polymerization. Then, as cycles of increasing and decreasing ultraviolet intensity are repeated, fresh initiation of polymerization occurs even as the previously initiated polymerization continues to propagate. In this way, careful control of the magnitudes of the low and high ultraviolet intensity levels, by selection of bulbs of appropriate radiation intensities and by adjustment of the distance between the bulbs and the mold assemblies with the polymerizable compositions, and careful control of the rate of change of the ultraviolet intensity received by the polymerizable composition (by selection of the rate of movement of the mold assemblies past the bulbs and selection of the number of bulbs arrayed end to end and their lengths), produces a polymerized article in which there is minimal residual unpolymerized monomer remaining, while the overall distribution of polymer chains and crosslinks provides a superior contact lens, and in which the polymerized article fills the mold cavity while minimizing any voids in the article or between the article and the inner surfaces of the cavity.

The apparatus can optionally be provided with the capability for varying the distance between the pallet and the ultraviolet bulbs. This capability can be provided by making the height of the conveyor system 13 adjustable. This capability can also be provided by making the surface 31 adjustable so that its height can be varied closer to or further from the conveyor surface.

In practice, it is preferred to precure the polymerizable composition before exposing it to the ultraviolet radiation which initiates and completes the polymerization process. Precure can be carried out by preparing a mold assembly as described hereinabove, and irradiating it with ultraviolet radiation at an intensity sufficient to initiate polymerization, the irradiation lasting from 10–40 seconds (in the absence of oxygen). This precuring has the additional advantage that the slight onset of polymerization that is experienced causes the polymerizable composition to increase in viscosity and to adhere to the two mold halves sufficiently that the mold halves behave as if they are adhering together. In addition, if the precure is carried out long enough so that the two mold halves are held together by a layer of polymerized material, then it is not necessary to maintain an oxygen-free atmosphere (e.g. nitrogen blanket) in the tunnel under the bulbs because that layer presents an effective barrier to diffusion of gas into the polymerizing composition.

The method and apparatus of the present invention are further illustrated in the following exemplification:

Mold assemblies of polystyrene having the shape depicted in FIG. 1, are arrayed in a two-by-four layout on a flat pallet. Each cavity between the mold halves of each mold assembly has the size and shape of a contact lens. Each cavity is filled with an anhydrous polymerizable composition which contains a water displaceable ester of boric acid and a polyhydroxyl compound. The components of the composition and the amounts thereof are disclosed in U.S. Pat. No. 4,495,313.

The pallet is placed on a conveyor belt which passes under a series of six housings arrayed side by side as shown in FIG. 2. Each housing after the first holds ultraviolet-emitting bulbs arrayed longitudinally as shown in FIG. 3. Each bulb held in one housing is essentially colinear with a bulb in the adjacent housing or housings. All bulbs are mounted in their respective housings to lie in the same plane. The vertical distance from the plane of the pallet to the plane of the bulbs, in the first housing 16 that contains bulbs that the mold assemblies encounter, should be about 25 mm to about 80 mm. That vertical distance to the bulbs in the subsequently traversed housings 17–20 should be about 50 to about 55 mm.

Ducts blow heated air into each of the spaces under all six housings, including the one that has no ultraviolet-emitting bulbs. For the polymerizable compositions employed in this example, the preferred temperatures to maintain around the pallet under each housing are about 49° C. to about 64° C. under the first two housings, and about 49° C. to about 59° C. under the other four.

The rate at which the pallet travels is preferably sufficient so that the total time that elapses from the moment that a given mold assembly first enters under the first housing 15 until it emerges from under the last housing 20 is preferably about 300 to about 440 seconds.

By operating in this manner, the mold assembly is exposed to five cycles of increasing and decreasing ultraviolet radiation intensity. In each cycle, the intensity of the ultraviolet radiation ranges from about zero, up to about 3–3.5 mW/Cm$^2$, and then back to about zero. Since the bulbs are of essentially identical length and the pallet moves at a constant speed, each cycle lasts essentially the same length of time.

What is claimed is:

1. An apparatus for polymerizing a polymerizable composition held in a mold to form a contact lens therefrom, wherein said mold is transparent to polymerization-initiating radiation and imparts the desired shape of a contact lens to said composition upon polymerization of said composition, the apparatus comprising a source of polymerization-inducing radiation, said source having a longitudinal axis; wherein the intensity of said radiation transmitted to a given plane parallel to said axis exhibits maximal intensity, sufficient to initiate polymerization of said composition at a first polymerization rate, within at least two regions of maximal intensity along said axis and lesser values less than said maximal values, yet sufficient to initiate polymerization at a second polymerization rate lower than the first polymerization rate, in regions of lesser intensity between each adjacent pair of said at least two regions and at each end of said axis, and wherein the intensity of said radiation varies smoothly between said maximal and said lesser intensities;

a transport apparatus capable of moving said mold relative to said source in said plane along a path equidistant from said longitudinal axis from one end thereof to the other, at a distance from said source such that said polymerizable composition is exposed to radiation of said maximal intensity value when said mold is adjacent to said regions of maximal intensity and to radiation of said lesser intensity when said mold is adjacent said regions of lesser intensity;

a heater capable of maintaining the temperature of the polymerizable composition above the glass transition temperature of the composition while the composition is exposed to said radiation, the temperature being effective to promote the propagation of said polymerization and to minimize shrinkage of said composition upon polymerization thereof; and a controller which controls the rate of movement of said mold relative to said source and the temperature of said composition during exposure thereof to heat from said heater, so as to cause complete initiation of polymerization of said composition and effective to cause polymerization of said composition into a body useful as a contact lens.

2. An apparatus according to claim 1 wherein said mold is transparent to ultraviolet radiation, and said source emits ultraviolet radiation.

3. An apparatus according to claim 2 wherein said source comprises a plurality of bulbs disposed on said longitudinal axis, wherein each of said bulbs emits ultraviolet radiation, wherein the ultraviolet radiation emitted from regions adjacent the ends of each of said bulbs is of lesser intensity and the ultraviolet radiation emitted from a region between said ends is of greater intensity.

4. An apparatus according to claim 3 wherein at least 3 of said bulbs are disposed on said axis.

5. An apparatus according to claim 3 wherein said source further comprises a second plurality of said bulbs disposed on a second longitudinal axis parallel to said longitudinal axis.

6. An apparatus according to claim 5 wherein at least 3 of said bulbs are disposed on each longitudinal axis.

7. An apparatus according to claim 3 further including a means to adjust the distance between said transport apparatus and said source.

8. An apparatus according to claim 3 wherein the bulbs are selected such that the intensity of the ultraviolet radiation emitted at any point of any given bulb is constant.

9. An apparatus according to claim 3 further comprising structure which maintains an atmosphere free of oxygen around said mold while said polymerizable composition is polymerized in said apparatus.

10. A process for forming a contact lens comprising
providing a mold assembly comprising a front mold half and a back mold half which together form a cavity therebetween in the shape and size of a contact lens, the mold cavity further comprising a composition disposed in said cavity which is polymerizable upon exposure thereof to polymerization-initiating radiation, wherein at least one of said mold halves is transparent to said radiation;
providing a source of polymerization-initiating radiation, said source having a longitudinal axis, wherein the intensity of said radiation transmitted to a given plane parallel to said axis exhibits maximal values, sufficient to initiate polymerization of said composition, within at least two regions of maximal intensity along said axis and values less than said maximal values in regions of lesser intensity between each adjacent pair of said at least two regions and at each end of said axis, wherein the intensity of said radiation varies smoothly between said maximal and lesser intensities;
providing heat to said polymerizable composition in said cavity while said composition is being exposed to said radiation from said source, said heat being sufficient to promote the propagation of said polymerization and to minimize shrinkage of said composition upon polymerization thereof; and
exposing said polymerizable composition to radiation from said source while moving said mold assembly relative to said source in said plane along a line equidistant from said longitudinal axis from one end thereof to the other at a distance from said source such that said polymerizable composition is exposed to radiation sufficient to initiate polymerization of said composition at a first initiation rate when said mold assembly is adjacent to said regions of maximal intensity and at a second initiation rate less than said first initiation rate when said mold assembly is adjacent said regions of lesser intensity while controlling the rate of said movement and the amount of heat supplied to said composition from said heat so as to cause complete initiation of polymerization of said composition and to cause said composition to polymerize into a body useful as a contact lens.

11. A process according to claim 10 further comprising maintaining an oxygen-free atmosphere around said polymerizable composition while irradiating it with said polymerization-inducing radiation.

12. A process according to claim 10 further comprising, prior to exposing said polymerizable composition to radiation from said source, irradiating said composition with polymerization-inducing radiation effective to initiate polymerization sufficient to cause said mold halves and said composition to adhere together.

13. A process according to claim 12 further comprising maintaining an oxygen-free atmosphere around said polymerizable composition while exposing it to said radiation from said source.

14. A process according to claim 10 wherein at least one of said mold halves is transparent to ultraviolet radiation, said composition disposed in said cavity is polymerizable upon exposure to ultraviolet radiation, and said polymerization-initiating radiation is ultraviolet radiation.

15. A process according to claim 14 further comprising, prior to exposing said polymerizable composition to radiation from said source, irradiating said composition with ultraviolet radiation effective to initiate polymerization sufficient to cause said mold halves and said composition to adhere together.

16. A process according to claim 14 wherein said source comprises a plurality of bulbs disposed on said longitudinal axis, wherein each of said bulbs emits ultraviolet radiation, wherein the ultraviolet radiation emitted from regions adjacent the ends of each of said bulbs is at a lesser intensity value and the ultraviolet radiation emitted from a region between said ends is at a greater intensity value.

17. A process according to claim 16 wherein at least 3 of said bulbs are disposed on said axis.

18. A process according to claim 16 wherein said source further comprises a second plurality of said bulbs disposed on a second longitudinal axis parallel to said longitudinal axis.

19. A process according to claim 18 wherein at least 3 of said bulbs are disposed on each longitudinal axis.

20. A process according to claim 16 wherein the temperature at which said polymerizable composition is maintained is in a range above the softening point of said composition.

21. A process according to claim 16 wherein the distance between said mold assembly and said source of radiation is adjustable.

22. A process according to claim 16 wherein the intensity of the ultraviolet radiation emitted at any point of any given bulb at a given time remains constant.

* * * * *